US012690662B2

(12) United States Patent
Truelove, III et al.

(10) Patent No.: US 12,690,662 B2
(45) Date of Patent: Jul. 28, 2026

(54) SHOULDER TRANSFER WEIGHT SUPPORT SYSTEM AND FACE SHIELD

(71) Applicant: G-Tech LLC, Wilmington, NC (US)

(72) Inventors: Leroy Truelove, III, Wilmington, NC (US); William Buchanan, Wrightsville Beach, NC (US); Richard S. Moore, Jr., Wilmington, NC (US)

(*) Notice: Subject to any disclaimer, the term of this patent is extended or adjusted under 35 U.S.C. 154(b) by 192 days.

(21) Appl. No.: 18/134,394

(22) Filed: Apr. 13, 2023

(65) Prior Publication Data

US 2023/0292914 A1 Sep. 21, 2023

Related U.S. Application Data

(63) Continuation of application No. 16/910,864, filed on Jun. 24, 2020, now Pat. No. 11,627,795, which is a (Continued)

(51) Int. Cl.

*A45F 3/10* (2006.01)
*A42B 5/00* (2006.01)
(Continued)

(52) U.S. Cl.

CPC .................. *A45F 3/10* (2013.01); *A42B 5/00* (2013.01); *A45F 3/04* (2013.01); *G21F 3/02* (2013.01); *A45F 2003/045* (2013.01)

(58) Field of Classification Search

CPC ....... A61F 9/06; A61B 6/107; A41D 13/1218; A41D 13/1184; G21F 3/02; G21F 3/025;
(Continued)

(56) References Cited

U.S. PATENT DOCUMENTS 3,394,260 A 7/1968 Phipps
4,015,759 A 4/1977 Dreissigacker et al.
(Continued)

FOREIGN PATENT DOCUMENTS

CN 306725028 7/2021
EM 0031491600001 6/2016
WO 2013128240 A1 9/2013

OTHER PUBLICATIONS

International Search Report and Written Opinion for Application No. PCT/US2023/030391, mailed on Apr. 16, 2024, 14 pages.
(Continued)

*Primary Examiner* — Corey N Skurdal
(74) *Attorney, Agent, or Firm* — Messner Reeves LLP

(57) ABSTRACT

A shoulder transfer weight support generally having a hip or waist belt, a back support, and one or more shoulder extensions. The back support has an upper back plate attached to the shoulder extensions and a lower back plate attached to one or more hip belts. The lower back plate features a bracket shaped to receive an end of the attachment bar that joins it to the upper back plate. A spring-loaded plunger can be inserted into the attachment bar to allow for height adjustment of the device. A face shield at least partially made of a radiopaque material and can attach to the back support. One attachment option is a yoke mount with vertical sections at either end of the yoke mount. A second option involves a mount that attaches to the shoulder extension(s). The device can use a full face shield or a face shield with an open front.

13 Claims, 9 Drawing Sheets

Related U.S. Application Data continuation-in-part of application No. 15/896,235, filed on Feb. 14, 2018, now Pat. No. 10,729,195.

(60) Provisional application No. 62/458,623, filed on Feb. 14, 2017.

(51) Int. Cl.
*A45F 3/04* (2006.01)
*G21F 3/02* (2006.01)

(58) Field of Classification Search
CPC ...... G21F 3/03; G21F 3/04; A45F 3/08; A45F 3/10; A45F 2003/146; A45F 2003/025; A42B 5/00
See application file for complete search history.

(56) References Cited

U.S. PATENT DOCUMENTS

| | | | | |
|---|---|---|---|---|
| 4,214,685 | A | 7/1980 | Pletz | |
| 4,286,170 | A | 8/1981 | Moti | |
| 4,386,277 | A | 5/1983 | Forshee | |
| D300,340 | S | 3/1989 | Faulconer | |
| 4,859,184 | A | 8/1989 | Hazard | |
| 5,015,864 | A * | 5/1991 | Maleki | G21F 3/02 250/516.1 |
| 5,022,099 | A | 6/1991 | Walton | |
| 5,038,047 | A | 8/1991 | Still | |
| 5,247,182 | A | 9/1993 | Servant et al. | |
| 5,261,873 | A * | 11/1993 | Bremer | A61F 5/055 602/5 |
| 5,388,274 | A | 2/1995 | Glover et al. | |
| 5,399,151 | A | 3/1995 | Smith | |
| 5,422,684 | A | 6/1995 | Keller | |
| 5,464,137 | A * | 11/1995 | Shirdavani | A41F 9/002 2/45 |
| 5,499,965 | A * | 3/1996 | Sanchez | A61F 5/028 128/100.1 |
| 5,500,954 | A | 3/1996 | Smith et al. | |
| D374,313 | S | 10/1996 | Munoz | |
| D375,186 | S | 11/1996 | Kim | |
| 5,599,305 | A | 2/1997 | Hermann et al. | |
| 5,609,278 | A | 3/1997 | Fresco | |
| 5,655,374 | A * | 8/1997 | Santilli | A41D 13/1218 2/905 |
| 5,834,789 | A | 11/1998 | Marchione | |
| 5,844,246 | A | 12/1998 | Marchione | |
| D404,490 | S | 1/1999 | Tripolsky | |
| 6,638,296 | B2 | 10/2003 | Levinson | |
| D501,078 | S | 1/2005 | Cabana | |
| 6,846,321 | B2 | 1/2005 | Zucker | |
| 7,223,266 | B2 | 5/2007 | Lindenbaum et al. | |
| D556,383 | S | 11/2007 | Petzl | |
| 8,067,759 | B1 | 11/2011 | Swartz et al. | |
| 8,182,439 | B2 | 5/2012 | Glenn | |
| 8,701,674 | B2 | 4/2014 | Tweardy et al. | |
| 8,710,477 | B1 | 4/2014 | Marchione | |
| 9,504,307 | B1 | 11/2016 | Burnett et al. | |
| 9,629,443 | B2 * | 4/2017 | Searle | A45F 3/10 |
| 9,750,632 | B1 | 9/2017 | Logan | |
| 9,867,625 | B2 | 1/2018 | Finkielsztein et al. | |
| 9,918,540 | B2 * | 3/2018 | Fawcett | F16M 13/04 |
| D821,089 | S | 6/2018 | Tadano et al. | |
| 10,016,251 | B2 | 7/2018 | Holman et al. | |
| 10,052,233 | B2 | 8/2018 | Yang et al. | |
| 10,213,213 | B2 | 2/2019 | Pancholy et al. | |
| 10,368,626 | B2 * | 8/2019 | Roque | A45F 3/04 |
| 10,448,685 | B2 * | 10/2019 | Czajka | A41D 13/1209 |
| 10,555,708 | B2 | 2/2020 | Egolf et al. | |
| D888,260 | S | 6/2020 | Park | |
| 10,729,195 | B2 | 8/2020 | Truelove, III et al. | |
| D917,709 | S | 4/2021 | Perraudeau et al. | |
| D949,349 | S | 4/2022 | Reinero | |
| D950,074 | S | 4/2022 | Thomas et al. | |
| D950,075 | S | 4/2022 | Thomas et al. | |
| D954,976 | S | 6/2022 | Li | |
| D967,968 | S | 10/2022 | Fried | |
| D987,087 | S | 5/2023 | Nolte et al. | |
| D989,969 | S | 6/2023 | Goumas et al. | |
| D1,081,075 | S | 7/2025 | Patel | |
| 2002/0153401 | A1 | 10/2002 | Werling | |
| 2005/0040193 | A1 | 2/2005 | May | |
| 2007/0074327 | A1 | 4/2007 | Davies et al. | |
| 2010/0204630 | A1 | 8/2010 | Sandifer et al. | |
| 2012/0227209 | A1 | 9/2012 | Vinson | |
| 2013/0270462 | A1 | 10/2013 | Beck | |
| 2015/0083941 | A1 | 3/2015 | Khandkar et al. | |
| 2018/0228235 | A1 | 8/2018 | Truelove, III et al. | |
| 2018/0257217 | A1 | 9/2018 | Johnson et al. | |
| 2019/0314027 | A1 | 10/2019 | Clark | |
| 2020/0155264 | A1 | 5/2020 | Waterman et al. | |
| 2020/0315325 | A1 | 10/2020 | Truelove, III et al. | |
| 2021/0151213 | A1 | 5/2021 | Milstein et al. | |
| 2023/0389677 | A1 | 12/2023 | Flohr et al. | |

OTHER PUBLICATIONS

Aoi S.M.D., et al., "Distal Transradial Artery Access in the Anatomical Snuffbox for Coronary Angiography as an Alternative Access Site for Faster Hemostasis," Catheter Cardiovasc Interventions, retrieved from the internet: https://onlinelibrary.wiley.com/doi/10.1002/ccd.28155, Feb. 6, 2019, pp. 1-7.

Bruhl D., "Best Posture Correctors," Bar Bend, Sep. 24, 2019, 5 pages, Retrieved from the Internet: URL: https://barbend.com/best-posture-correctors/.

Chatelain P., et al., "New Device for Compression of the Radial Artery After Diagnostic and Interventional Cardiac Procedures," Catheterization and Cardiovascular Diagnosis, vol. 40, 1997, pp. 297-300.

Chu H.H., et al., "Update on Transradial Access for Percutaneous Transcatheter Visceral Artery Embolization," Korean Journal of Radiology, 2021, retrieved from the internet: https://kjronline.org/DOIx.php?id=10.3348/kjr.2020.0209, on Aug. 28, 2020, vol. 22 (1), pp. 72-85.

Costa F, et al., "Radial Compression Devices Used After Cardiovascular Interventions," Vascular Closure Devices, Jul./Aug. 2019, vol. 13(4), pp. 67-71.

Instagram, "Aspen Medical Products," Mar. 9, 2020, 1 page, Retrieved from the Internet: URL: https://www.instagram.com/p/B9iX3jED7o4/.

Kawamura Y., et al,, "Impact of Dedicated Hemostasis Device for Distal Radial Arterial Access With an Adequate Hemostasis Protocol on Radial Arterial Observation by Ultrasound," Cardiovascular Intervention and Therapeutics, retrieved from https://doi.org/10.1007/s12928-020-00656-4.pdf, vol. 36, Mar. 12, 2020, pp. 104-110.

Oliveira M.D.P., et al., "Distal Transradial Access as Default Approach for Coronary Angiography and Interventions," Cardiovascular Diagnosis and Therapy, retrieved from the internet: https://cdt.amegroups.com/article/view/30250/26116, vol. 9(5), Oct. 2019, pp. 513-519.

PreludeSYNC, EVO Radial Compression Device, Merit Medical Systems, Inc., 1 page.

PreludeSYNC, "Radial Compression Device Reference Guide," Merit Medical Systems, Inc., publication date unknown, 1 page.

PreludeSYNC, Radial Compression Devices Family, Merit Medical System Inc., publication date unknown, 6 pages.

PreludeSYNCDISTAL, "Radial Compression Device," Product Description, Medical Systems, Inc., 2017, 70 pages.

TR Band, "Radial Compression Device," Terumo Interventional Systems, 2019, 3 pages.

Youtube, "DonJoy Back Brace II—TLSO—Patient Instruction Video," Nov. 20, 2015, 3 pages, Retrieved from the Internet: URL: https://www.youtube.com/watch?v=6fuhZfd3FVg.

Youtube, "VENUM 1 TLSO ATE Assembly," Oct. 3, 2013, 3 pages, Retrieved from the Internet: URL: https://www.youtube.com/watch?v=5n59X2bDr6Y.

(56) References Cited

OTHER PUBLICATIONS

Randall May, “Randall May Marching Bass Drum Carrier (RMLEB),” Amazon [online], Sep. 4, 2023, 5 pages, Retrieved from the Internet URL: https://www.amazon.com/Randall-May-Marching-Carrier-RMLEB/dp/B0C2FHX4X7.
“Salus Scientific Corp,” Found online Oct. 16, 2024 at youtube.com, Reference dated Mar. 16, 2023, Retrieved from https://www.youtube.com/watchv=JaOgDHUDm1U.
“Facebook: Samson Surgical & Orthopaedic.” Found online Nov. 26, 2024 atfacebook.com. Reference dated Dec. 21, 2018. Retrieved from https://www.facebook.com/samsonorthopaedic/videos/samson-new-launch-tlso-corsetthoracic-lumbo-lace-pull-brace-ls-0416smlxl2xlgot-a/1946166668783493/.
“HypeBeast: Let This ‘Evangelion’ Unit-01 Harness Do the Heavy Lifting.” Found online Nov. 26, 2024 at hypebeast.com. Reference dated Aug. 29, 2022. Retrieved from https://hypebeast.com/2022/8/evangelion-unit-01-daiya-darwing-hakobelude-light-eva-test-type-model-lifting-harness.
“Orsif: Salus Scientific Joins ORSIF,” Found online Oct. 16, 2024 at orsif.org. Reference dated Jul. 29, 2024. Retrieved from https://www.orsif.org/post/salus-scientific-joins-orsif.
EP23873411.5, Partial Supplementary European Search Report, Oct. 28, 2025, 13 pages.

* cited by examiner

SHOULDER TRANSFER WEIGHT SUPPORT SYSTEM AND FACE SHIELD

CROSS-REFERENCE TO RELATED APPLICATIONS

This application claims the benefit of priority to and is a continuation-in-part of U.S. Non-Provisional application Ser. No. 15/896,235 filed on Feb. 14, 2018 which claims the benefit of U.S. Provisional Application No. 62/458,623 filed on Feb. 14, 2017. The content of both U.S. Non-Provisional application Ser. No. 15/896,235 filed on Feb. 14, 2018 and U.S. Provisional Application No. 62/458,623 filed on Feb. 14, 2017 are incorporated by reference in their entireties.

BACKGROUND OF THE INVENTION

(a) Field of the Invention

The present disclosure is in the technical field of medical devices. More particularly, the present disclosure relates to an improved support device, and related accessories, to be worn by medical professionals and others exposed to radiation.

(b) Background Art

A number of medical, dental, research and even military personnel routinely perform procedures that expose them to various forms of radiation. Devices have been invented over the years to provide medical and other professionals with protection from radiation as well as biological matter, debris, and other airborne matter that can be transmitted to such professionals while they work. The medical field in particular has produced a number of different types of protective devices meant to shield the wearer from dangerous materials. One such device is described in U.S. Non-Provisional application Ser. No. 15/896,235 ("the '235 application") filed on Feb. 14, 2018.

The device disclosed in the '235 application is a fixed-angle, wearable device that supports the weight of a heavy garment, such as a lead apron, and transfers the weight of the garment that would normally be supported by the wearer's shoulders and/or neck to the wearer's hips. While other inventors have created devices that support equipment mean to shield people from radiation, these devices do not transfer the weight of the garment away from the user's shoulders and spine to the their pelvis. One such device is described in U.S. Pat. No. 9,504,307 issued to the US Airforce ("the '307 patent"). That reference describes a device that purports to transfer weight to a mounting plate against the user's lower back and the hip belt attached to the device. This device has a series of segmented "vertebrae" that make up the back support of the device and as a result, the device sacrifices weight transfer and support for increased mobility.

Other devices of course focus primarily on the wearer's face and neck. Traditional face shields attach to the head and are uncomfortable and they restrict the movement of the user's head and neck. In addition, they tend to be vertically oriented meaning they do not provide adequate protection to the area between the user's chin and their upper torso. A number of attempts have been made to create face shields that resolve these issues.

For instance, U.S. Pat. No. 5,038,047 issued to Shirley Still describes a radiopaque helmet/mask to be worn by the user reminiscent of the helmet worn by a medieval knight. Generally, wearing a mask during surgical and other medical procedures is a considered by the profession to be a bad idea due to the limited vision and discomfort associated with their use. Similarly, U.S. Pat. No. 5,022,099 issued to Charles Walton describes a more modern looking football helmet made of radiopaque materials that does not provide any coverage to the face, upper body or neck. More recently, U.S. Pat. No. 10,016,251 issued to Ross Holman and Brian Knott described a few different types of helmet—all of which attach directly to the user's head and are meant to be operably connected to a display screen integrated into the helmet. None of these devices provides adequate protection to a user's face and neck without compromising mobility, comfort and/or vision.

Some people have attempted to resolve these problems be creating larger helmets that integrate some form of upper body protection. For example, U.S. Pat. Nos. 4,286,170 and 4,386,277 issued/assigned to Samuel Moti describe a face shield that is mounted on the user's shoulders and extends upward in a half cylinder shape to extend above the user's head. U.S. Pat. No. 4,859,184 issued to James T. Hazard describes a face shield that has a panel fixed at an angle to the shield that rests against a user's chest, thereby supporting the face shield in front of the user's face. Hazard describes different means of attaching the panel to the user including hooks that lay on the user's shoulders and an elastic band that fits around the neck. Similarly, U.S. Pat. No. 5,500,954 describes a shield that rests on the user's chest and/or attaches to their neck via an elastic band—the shield extending in front of the user's face and extending around their neck in some embodiments. Each of these devices places some pressure or weight onto the user's neck and shoulders, thereby placing strain on these body parts. Straining a user's neck and/or shoulders during a lengthy procedure could have seriously adverse consequence.

Some inventors have also created face shields that are integrated into a radiopaque garment to provide the additional protection for the upper body and face. For example, U.S. Pat. No. 8,933,426 and U.S. Patent Publication Number 2011/0174997 describe a device that attaches to the user's shoulder and torso, but the weight of the device is at least partially transferred to a separate structure such as the floor, wall, ceiling or separate stand. The wearer is meant to move into and out of the protective equipment as the equipment stays relatively stationary with respect to the patient and the rest of the equipment in the room. The shield that is attached to these devices is specifically attached to the radiopaque clothing or other body shielding.

The inventors have devised a system that includes a frame that can support a heavy garment or piece of equipment like a full-length lead apron and transfer the weight of the equipment or garment that would normally be supported to by the user's head, neck and/or shoulders to the their hips. Another object of the invention is to provide improved equipment to provide adequate protection from harmful materials that are directed at the user's neck, throat and upper body. Another object of the invention is to provide a system for attaching accessories to the frame that will provide additional protection to the user. Another object of the invention is to provide protective equipment that is significantly more comfortable to wear and use than those in the prior art. These and other advantages will become apparent from the following detailed description taken in connection with the accompanying drawings.

BRIEF SUMMARY OF THE INVENTION

U.S. Non-Provisional application Ser. No. 15/896,235 (hereinafter "the '235 application") describes a fixed-angle, wearable device that supports the weight of a heavy garment, such as a lead apron or other heavy garment and transfers the weight of the garment that would normally be supported by the wearer's shoulders and/or neck, to the wearer's hips. By transferring the weight off the shoulders, there is also less pressure on the cervical spine as many radiologic procedures require the wearer bend forward for significant periods of time. At the same time, the device also helps to correct the wearer's posture and to support their lower back to alleviate weight and pressure that over time can cause lower back injuries. The device also creates space between the wearer's body, particularly their shoulders and the backs, and the radiopaque garment being worn and, as a result, helps to provide ventilation within the garment while in use.

Preferred embodiments of the shoulder transfer weight support generally have three components consisting of a hip or waist belt, a back support, and one or more shoulder extensions. The shoulder extensions consist of rigid bars, slabs or blocks of material that attach to the back support and extend away from the back support and above the wearer's shoulders when the device is worn.

Some embodiments of the device described in the '235 application included protrusions or pins located on a surface of the shoulder extensions such that the pins protrude away from the shoulder extensions and the wearer. These protrusions can be used to attach other devices, such as a splash shield or face shield to the invention. However, preferred embodiments of the improved device eliminate these pins. The device may feature a non-slip material attached to one or more portions of the shoulder extensions, including, but not limited to the portions most likely to come into contact with the garment.

Preferred embodiments of the shoulder extensions are flattened, curved metallic bars that attach at one end to an upper portion of the frame and extend up and over the user's shoulders when the device is worn. These shoulder extensions are attached to a back support that generally includes an upper back plate, a lower back plate, and an attachment bar. Preferred embodiments include shoulder extensions are attached to the upper back plate at an angle to the center of the upper back plate such that they extend outward away from the user's head as they extend over the user's shoulders. Alternately, the device can be constructed such that the shoulder extensions are joined permanently with the back plate to form one unitary structure. A skilled artisan will readily realize that several means of attachment can be used to secure the shoulder extensions to the upper back plate and that holes or threaded bores passing through the upper back plate and the shoulder extensions could be used to accommodate a variety of fasteners to accomplish this purpose. Moreover, when the shoulder extensions are releasably attached to the back support, the plurality of holes on both the shoulder extensions and the upper back plate allow the user to reposition the shoulder extensions in relation to the rest of the device by using different holes to attach the shoulder extensions to the upper back plate. In addition, the preferred embodiment and the inventor's anticipated best mode of the improved Shoulder Transfer Weight Support System include padding on ventral side of the shoulder extensions, i.e. the side that faces the user when worn. In some embodiments, the padding features holes complementary to the holes in the shoulder support and the upper back plate so that the same fastener can be used to hold all three parts together at the same time. Other embodiments use other fasteners such as glue or double-sided tape to attach the padding to the shoulder extensions.

The '235 application describes some preferred embodiments having the upper and lower back plates each being separately attached to an upper and a lower attachment bar, respectively. Some of these embodiments include a hinge joining the upper and lower back plates. The upper and lower attachment bars were joined together via a hinge. However, the presently disclosed system uses a single, rigid bar, i.e. the attachment bar, attached to the upper back plate at one end and the lower back plate at the opposing end. In addition, the lower back plate is shaped to receive the lower end of a single attachment bar, i.e. the lower back plate is shaped to form a bracket that at least partially encircles the portion of the attachment bar inserted therein. This structure helps to hold the attachment bar in place relative to the lower back plate and serves to create some space between the user and the face of the attachment bar adjacent to their body. In preferred embodiments and the anticipated best mode of the device, the lower end of the attachment bar features a number of holes or threaded bores extending all the way through from one side of the attachment bar to the opposing side sized, positioned and shaped to align with one or more complementary holes or threaded bores located in the lower back support and to allow the two parts to be fastened together. These embodiments feature a fastener, preferably a retractable plunger, i.e. a spring-loaded plunger, configured to be inserted into the holes or bores in the attachment bar and the lower back plate thereby attaching the lower portion of the device featuring the lower back plate and the hip belt(s) to the upper portion that featuring the shoulder extensions.

Attached to the lower back plate is/are one or more belts designed to encircle the waist and hips of the person using the device. The means of attaching the hip belt to the lower back plate are holes or threaded bores in the lower back plate that align with holes or bores in the hip belt. The hip belt is a padded belt that is meant to be worn around the wearer's waist area and has a buckle or clasp allowing the wearer to attach the two free ends of the hip belt. The improved version of this device can feature a second belt—a stretch belt—to allow the user to attach the device to their hips, adjust the position of the device and then attach the hip belt. The stretch belt is locating inside the hip belt which is to say that the stretch belt is attached to an inner surface of the hip belt and extends around the person wearing the device such that it is between the hip belt and the person wearing the device. Optionally, the stretch belt can be made with a lumbar pad located on the portion of the stretch belt that is in contact with the lower back plate. The hip belt itself is directly attached to the lower back plate. In a preferred embodiments of the device and the inventors' anticipated best mode, the stretch belt has a built in lumbar pad and is attached to the hip belt by hook and loop fasteners; although, other attachment means could be used as well. A skilled artisan will appreciate that the stretch belt can be a separate structure from the hip belt, or the two can be integrated into a single structure.

In use, the person wearing the device first adjusts the height of the device by removing the spring-loaded plunger from the complementary holes or bores in the alignment bar and lower back plate, adjusting the upper back plate to the desired height and then reinserting the plunger into the holes or bores. Similarly, in some embodiments, the position or height of the shoulder extensions can be adjusted by removing the fasteners holding them to the upper back plate, repositioning them relative to the holes or bores on the upper back plate and then reattaching the two pieces. The user then dons the device by putting it on their back and securing the stretch belt around their waist. The wearer than adjusts the positioning of the device with respect to their body and when the device is properly positioned, they secure the hip belt around their waist. Once the user is wearing the device, the lead apron or other garment is attached to the device such that the garment is worn over the device. The shoulder extensions can fit into sleeves featured by the garment—the typical lead apron used by medical professionals often has sleeves already integrated into it. In addition, nonslip pads featured on the outer facing portions of the shoulder extensions help to hold the garment in place by creating friction between the garment and the nonslip pads.

When the hip belt is secured around the waist and the garment is attached or draped over the device, the weight of the garment and the device does not rest on the wearer's shoulders or spine, but is transferred to their hips. The lower and upper back plates are shaped such that the device, when the wearer stands upright, does not contact the user's back, neck or shoulders. The positioning of the padding assists in holding the device in place on the user and creating space between the garment and the user. That space between the user and the heavy garment allows air entering (through the sides or top of the apron or garment) to circulate and keep the wearer cooler than they would be if they wore the garment against their person. The device thereby allows the wearer to perform lengthy medical procedures, even those that require bending over the patient for prolonged periods of time, without having to support the weight of the required radiopaque garments with their shoulders or backs.

Preferred embodiments and the inventors' anticipated best mode of this device use the following parts and structures; although, these features can be interchanged with a number of other materials and the device will still function as described. Ideally the shoulder extensions are approximately 1.5 inches wide 6061 aluminum bars that are flattened and approximately 3⁄16 of an inch thick. Stainless steel #10-24 binding barrels and #10-24 stainless steel machine screws are inserted through complementary holes in the shoulder extensions and the upper back plate to connect each shoulder support to the upper back plate. These same embodiments use an elastomer compound, Regupol #7210, to form the nonslip pads on the shoulder extensions and/or upper or lower back plates. Poron 4701-40 soft rubber being approximately 0.50 inches thick with a piece of approximately 0.0625-inch-thick ABS plastic for spacing and attachment is used to form the pads on the shoulder extensions and/or upper or lower back plates. The upper and lower back plates are vacuum formed pieces of Boltaron 4335 plastic that are approximately 0.188 inches thick. The attachment bar is attached to the upper and lower back plates with #10-24 stainless steel machine screws and nylon lock nuts. The attachment bar itself is approximately 1.50 inches wide and approximately 0.188 inches thick and is made of 6061 aluminum rectangular bar stock. The length of the attachment bar can be varied to increase or decrease the size or height of the overall device as desired. These same embodiments use steel binding barrels having a ¼ inch—20 thread and are ⅜ inches long to attach the hip belt to the lower back plate. The hip belt includes two grommets with an inner diameter of approximately 0.3125 inches. Approximately in this context means within 0.25 inches of the stated measurement. The spring-loaded plunger can take a number of forms, but the inventors' anticipated best mode uses a twist-to-lock pull-ring retractable spring plunger.

The inventive weight support allows the user to use/wear heavy shielding garments without obstructing the function of those garments. The invention allows a user to wear various types of heavy clothing or equipment without interfering with the normal movements of the wearer. The device also provides lumbar support and improves body ventilation for those wearing heavy shielding garments. By transferring weight away from the shoulders, the device reduces the incidence of cervical orthopedic injury sustained by the user. By providing lumbar support to the user, the weight support also results in improved posture and reduces the incidence of lower back strain and injury. Moreover, because the weight support creates some separation between the clothing and the user, the weight support serves to provide additional ventilation that is not available when the user wears the same clothing or equipment directly against their body. The device is light weight, comfortable, durable, easy to clean, and easy to put on or remove. In addition, since the device is not integrated into a garment, the device can be used with more than one garment including a "half-garment" that is meant to be worn only over front of the wearer. In such embodiments, the back support and other components of the device can be made of or infused with radio-opaque materials to help increase the shielding provided by the garment.

The Face Shield

The inventors have also designed a face shield as an accessory that can be used with the weight transfer support device described above and in the '235 application. The various embodiments of the face shield below can be used with the disclosed weight transfer support device or with other frames. Generally, the face shield is made with a radiopaque material. Preferred embodiments of the face shields use a lead acrylic material that is between 3⁄16 of an inch to 5⁄16 of an inch thick. The lead glass is tempered with all edges polished.

A first set of embodiments of the face shield includes a face shield attached to a yoke mount that also connects to the shoulder transfer weight support system described above and in the '235 application. The yoke mount is a structure, such as a metal bar, to which the face shield and a back attachment are connected. In the inventors' anticipated best mode of this embodiment, the face shield is attached to a shield mount, which is a structure featuring attachment means that attach the face shield to the yoke mount. In some preferred embodiments, the shield mount is a block with holes to accept fasteners that also is fixed to the face shield using conventional fasteners such as screws. It is not necessary that the shield mount be releasably attached to the face shield. The shield mount is releasably connected to a portion of the yoke mount by a separate fastener such as a thumb screw. That is to say the shield mount features a channel or bore or similar structure through or with which a portion of the yoke mount passes or engages and is held in place using pressure applied via a fastener such as a thumb screw. This arrangement allows the user to adjust the position of the face shield relative to the yoke mount by manipulating the thumb screw or other fastener holding the shield mount to the yoke mount to loosen the connection between the yoke mount and the shield mount, repositioning the shield mount relative to the yoke mount and then tightening the fastener.

Some embodiments of the yoke mount include one bar or similar durable structure that is configured to extend around the user's head on either side. These embodiments of the yoke mount include a rigid bar with a rounded exterior that has two vertical portions at opposite ends connected by a horizontally oriented portion that extends over each shoulder and behind the user's head and neck. The vertical portions of the yoke mount extend upward, away from the tops of the user's shoulders and/or the shoulder extensions, as well as, adjacent to the side of the user's head. The face shield mount releasably connects the face shield to this vertical portion of the yoke mount thereby allowing the vertical position of the face shield to be easily adjusted. While a skilled artisan could appreciate the yoke mount could be made of separate pieces, one for each side of the user for example, the inventors have determined the preferred design is to make the yoke mount one single structure that extends around both sides of the user's head.

In these embodiments, the yoke mount is attached to the shoulder transfer weight support system described above by a back attachment bar. At one end the back attachment bar is attached to the upper back plate of the back frame and at the other end the horizontal portion of the yoke mount is pivotally connected to the back attachment bar. That is to say that the yoke mount can rotate around the longitudinal axis formed by an imaginary line running through the center axis of the portion of the yoke mount that is pivotally connected to the back attachment bar. The back attachment bar has a machined fitting that forms a channel in which the yoke mount can so rotate. This is easily accomplished by machining the back attachment to include a channel or bore through which at least a portion of the horizontal section of the yoke mount passes, loosely enough that it can rotate within the channel or bore.

In these embodiments of the face shield, the face shield extends around the face of the wearer and connects to and is held in place on the yoke mount on either side by the shield mounts that are releasably connected to the yoke mounts on either side of the face shield. Because the yoke mount is able to rotate, the face shield is able to move with the user when they move their head or lean forward. In this set of embodiments, the face shield rests at least partially on the shoulder extensions of the shoulder weight transfer device allowing the shoulder extensions to support the full weight of the face shield.

A second set of embodiments of the face shield eliminates the yolk mount described above. Instead it is configured to attach the face shield to the shoulder extensions of the shoulder transfer weight support system also thereby allowing the shoulder extensions to support the full weight of the face shield. These embodiments replace the yoke with a vertical mount bar and a horizontal slide bar which can be separate structures attached to each other or they can be made as one single structure. The vertical mount bar attaches to the face shield in the same manner as the vertical portion of the yolk does in the embodiments described above. That is to say the shield mount features a channel or bore or similar structure through or with which a portion of the vertical mount bar passes or engages and is held in place using pressure applied via a fastener such as a thumb screw. The horizontal slide bar is attached to the vertical mount bar. The angle and point of attachment between these two structures can be varied as desired. In these embodiments, the horizontal slide bar is attached to the shoulder extensions of the shoulder transfer weight support via a mount, i.e. the shoulder extension mount.

The inventors prefer the shoulder extension mount is releasably connected to the horizontal slide bar so that the position of the face shield can be adjusted in a horizontal plane rather than just a vertical plane. More specifically, preferred embodiments use a thumb screw to releasably attach the shoulder extension mount to horizontal slide bar. While the shoulder extension mount can also releasably attached to the shoulder extension, the inventors anticipate the most practical version of this device will involve using friction to keep the shoulder extension mount in place as it is shaped to provide a groove into which the shoulder extension, together with its padding, and the radiopaque garment to be worn on the shoulder extensions is inserted. Other iterations of the shoulder extension mount include means to adjust the width of the groove featured by the shoulder extension mount to provide for a tighter fit. The inventors specifically anticipate this device will be used with the shoulder transfer weight support system described above and/or in the '235 application; however, all of the embodiments above can be mounted to other devices if desired.

Still other embodiments of the inventive face shield include a face shield that does not extend completely around the user's face. The above embodiments anticipated that the user will need to protect themselves from radiation that may eliminate towards either side of their head or body. Alternate embodiments of the face shields have an open front. For example, in one embodiment, the face shield extends along the side of the user's head and terminates in a curved shape that bends toward the user's face, but stops short of extending all of the way in front of it and/or covering the user's mouth. Another example would include an entirely flat face shield that extends only laterally along the side of the user's head, but does not include a curved portion that extends towards or in front of the user's face.

In this disclosure, terms such as horizontal, upward, vertical, above, below, beneath, and the like, are used solely for the purpose of clarity in illustrating the invention, and should not be taken as words of limitation. The drawings are for the purpose of illustrating the invention and are not intended to be to scale. Generally, references to upward directions, including "above" and "over" indicate a direction towards the wearer's head when the device is being worn. Directions indicating a downward direction including "beneath" and "under" indicate a direction toward the wearer's feet when the device is being worn. "Ventral" refers to a direction towards the wearer's abdomen while the device is being worn. "Dorsal" refers to a direction towards the back support of the device.

BRIEF DESCRIPTION OF THE SEVERAL VIEWS OF THE DRAWING(S)

DETAILED DESCRIPTION OF THE INVENTION

Figure 1:
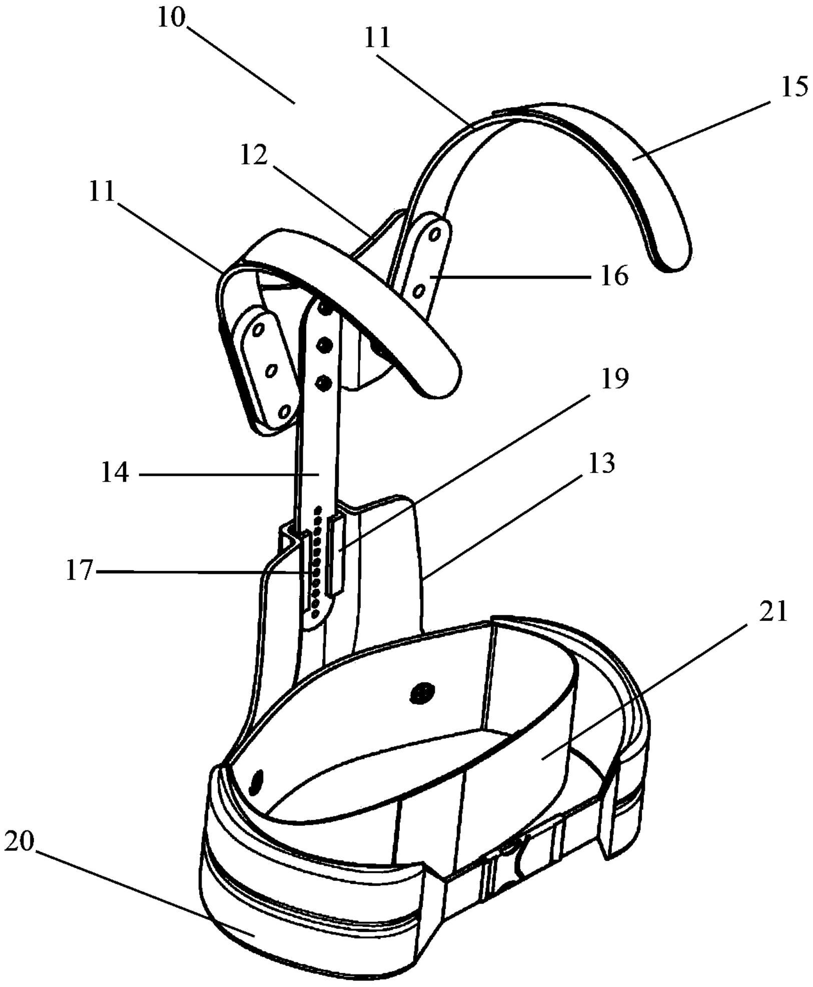
FIG. 1 is a left side perspective view of a preferred embodiment of the shoulder transfer weight support system.
Figure 2:
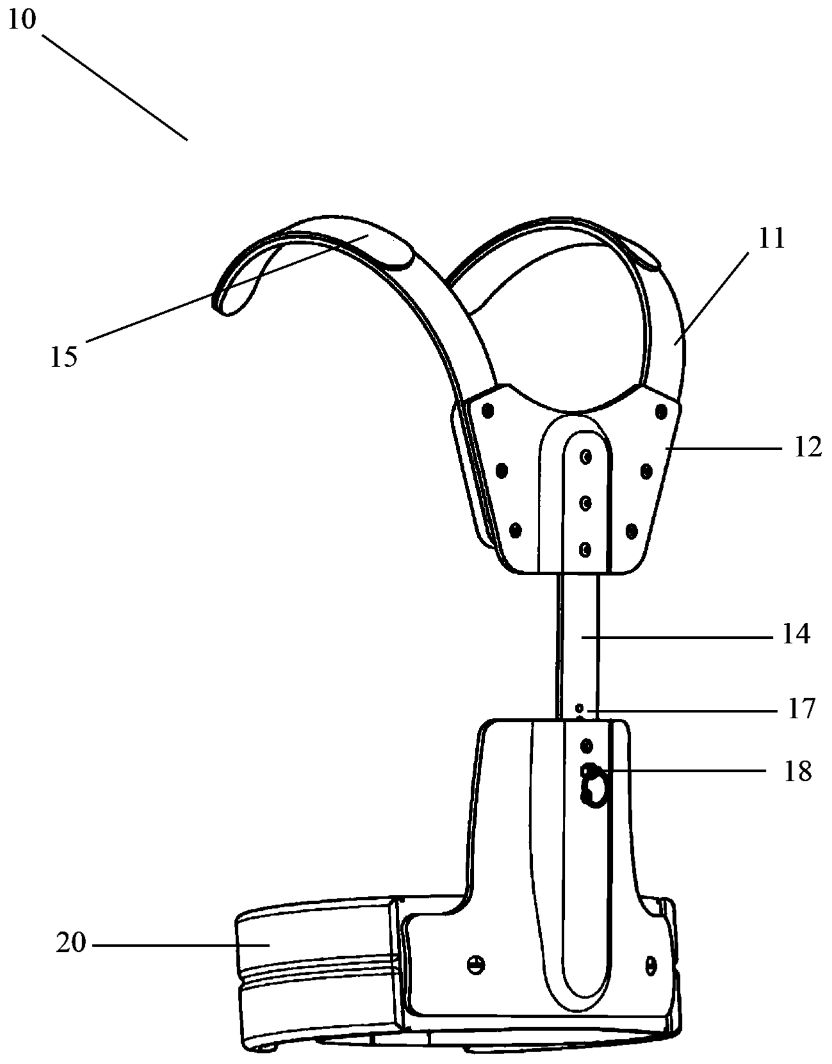
FIG. 2 is rear right side perspective view thereof.
Figure 3:
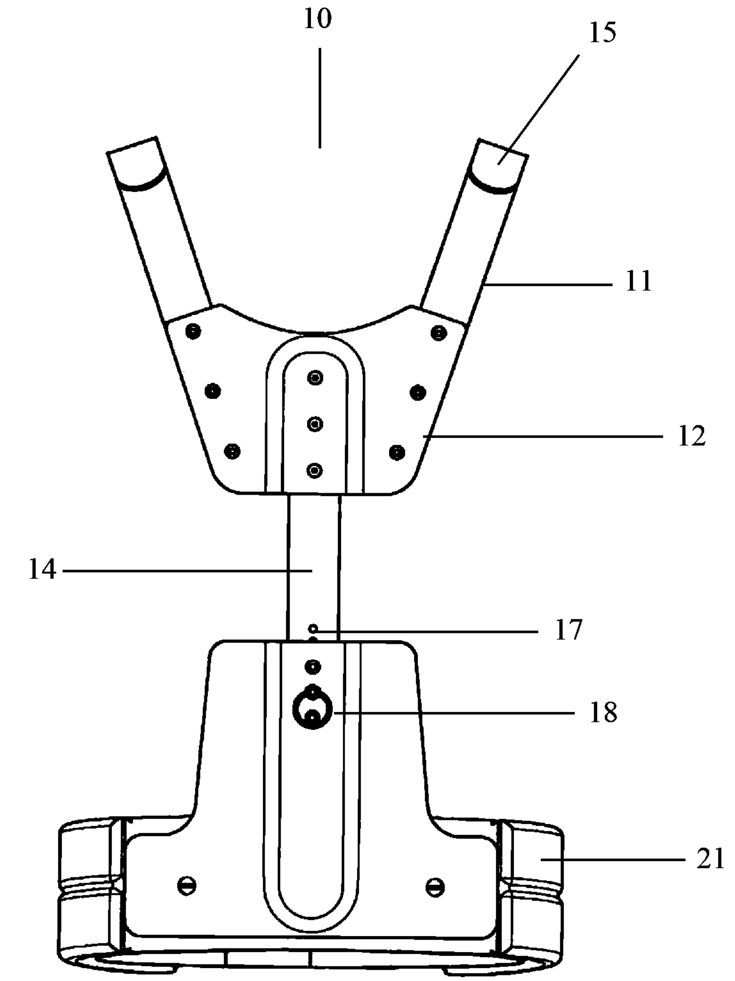
FIG. 3 is a back perspective view thereof.
Figure 4:
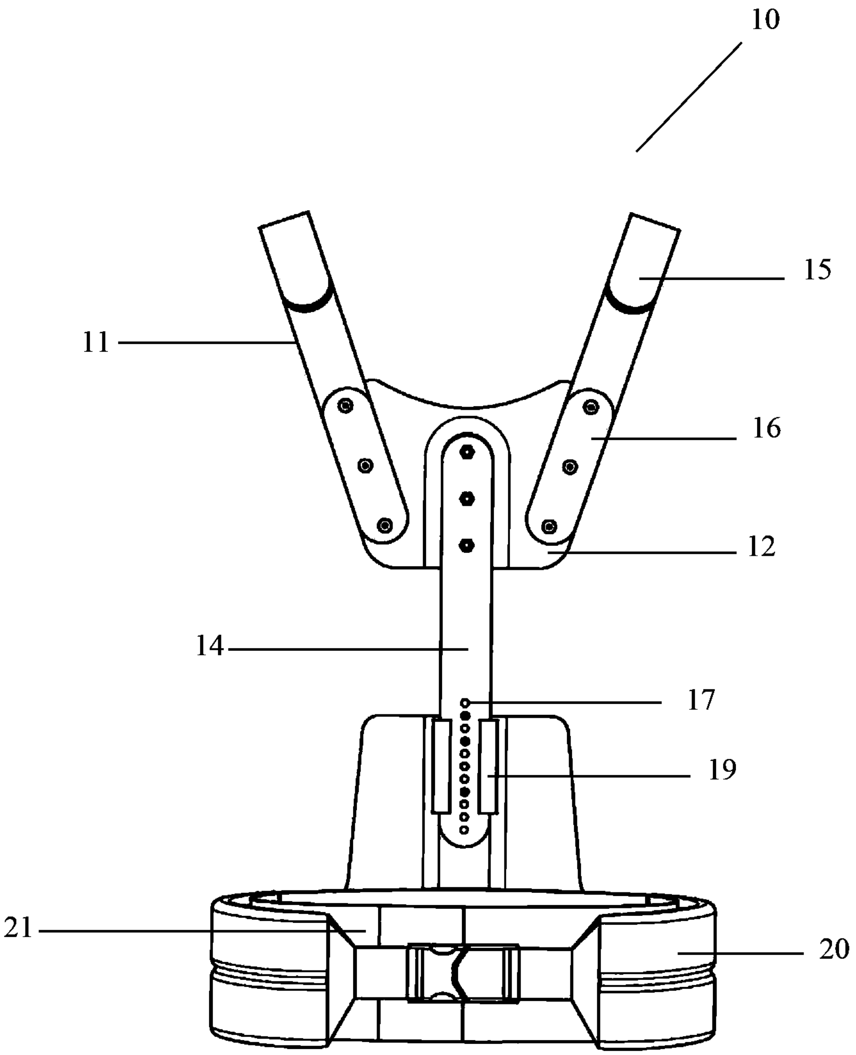
FIG. 4 is a front perspective view thereof.
Figure 5:
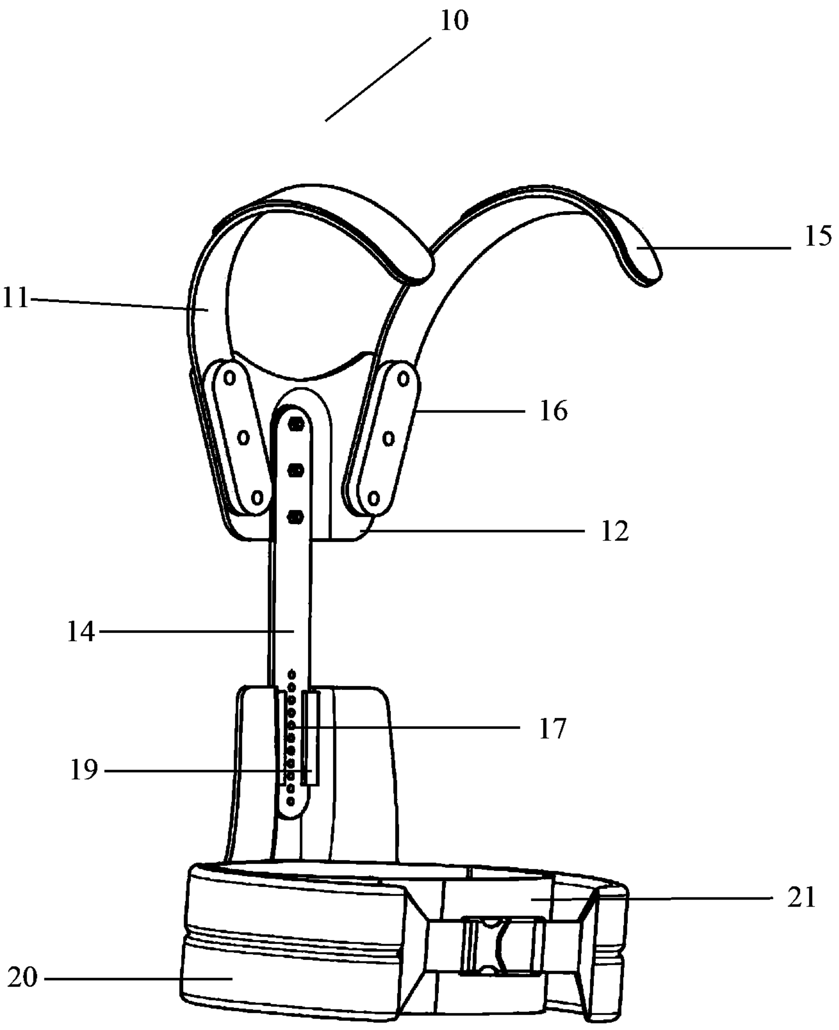
FIG. 5 is a left side perspective view thereof.
Figure 6B:
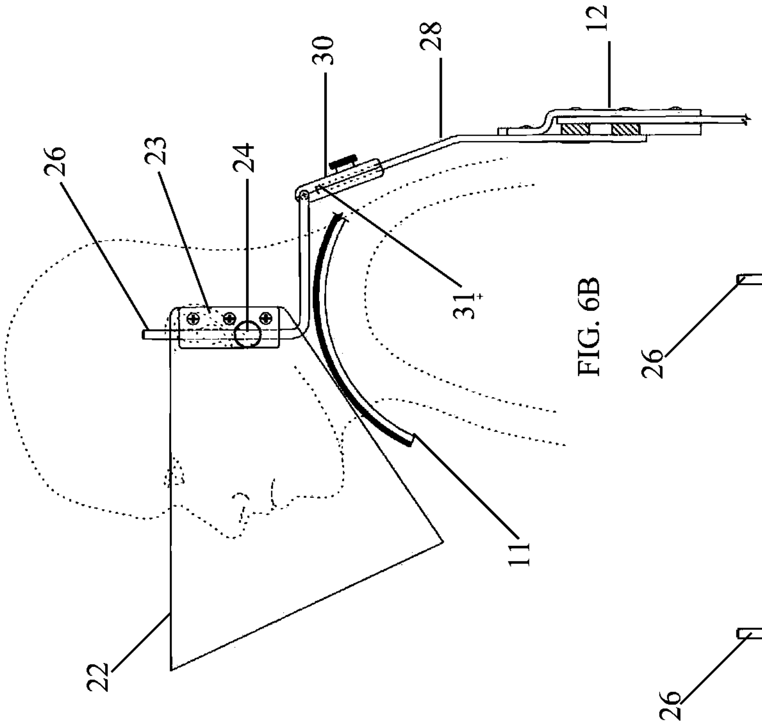
FIG. 6B is a right side perspective view thereof.
Figure 6D:
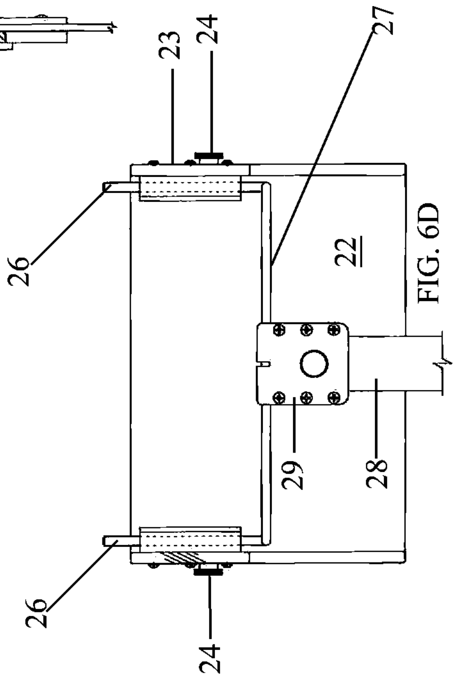
FIG. 6D is a rear perspective view thereof.
Figure 6A:
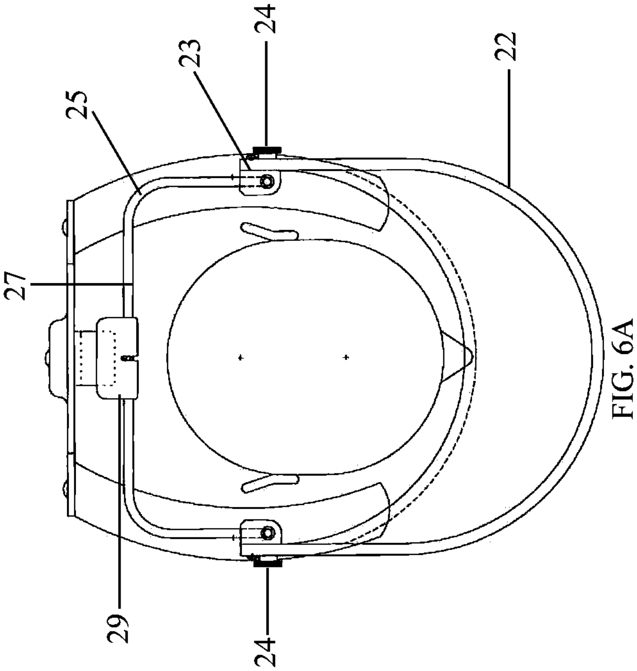
FIG. 6A is a top perspective view of an embodiment of the weight transfer support system featuring a first embodiment of the face shield.
Figure 6C:
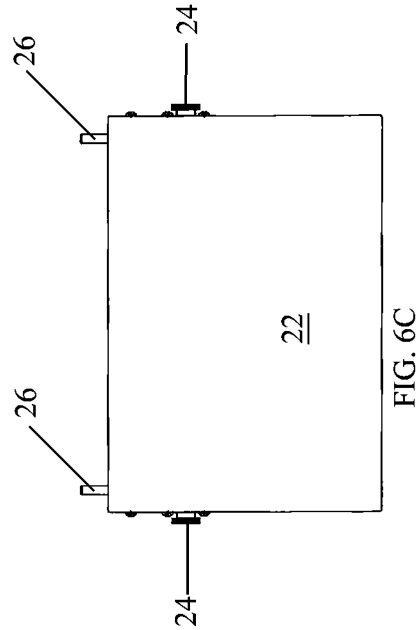
FIG. 6C is a front perspective view thereof.
Figure 7B:
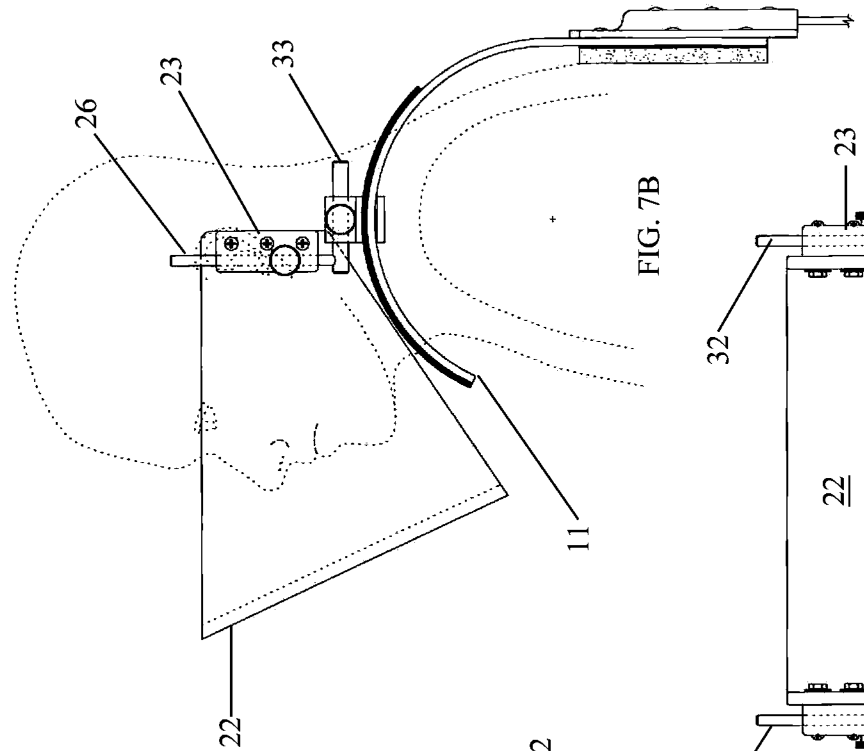
FIG. 7B is a right side perspective view thereof.
Figure 7D:
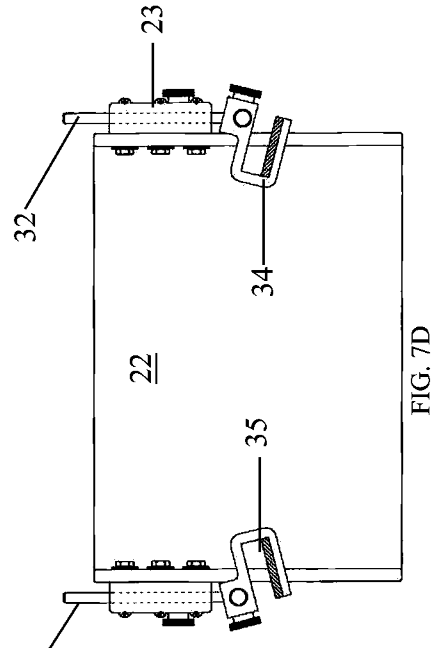
FIG. 7D is a rear perspective view thereof.
Figure 7A:
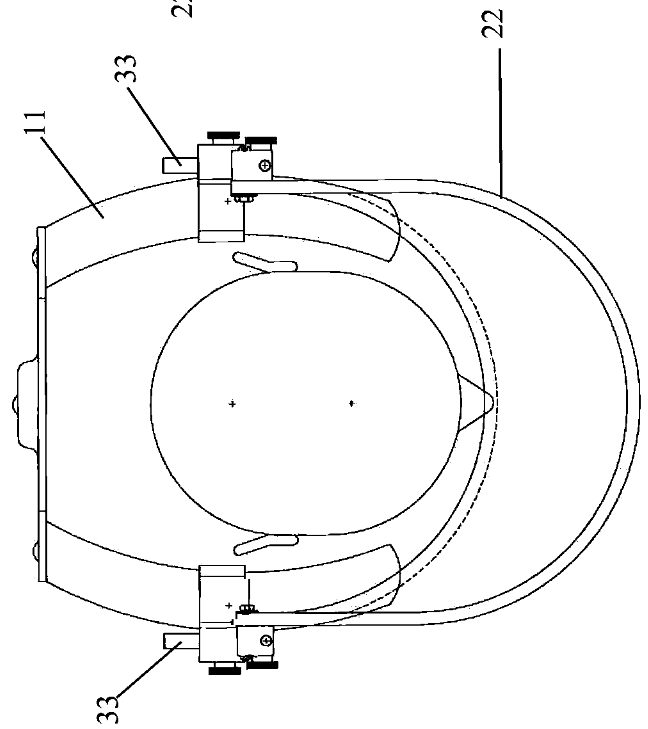
FIG. 7A is a top perspective view of an embodiment of the weight transfer support system featuring a second embodiment of the face shield.
Figure 7C:
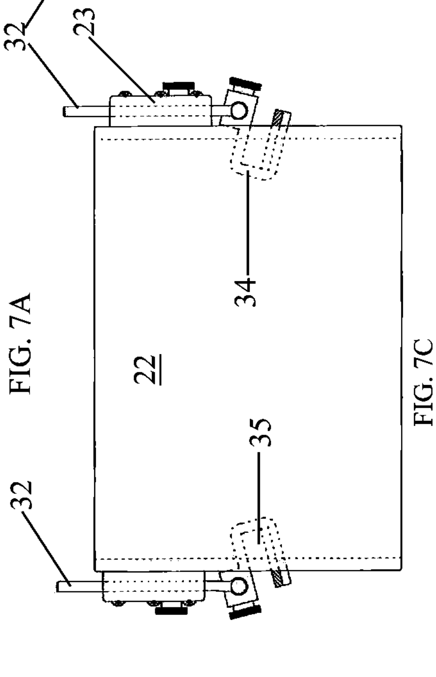
FIG. 7C is a front perspective view thereof.

FIGS. 1-5 show a preferred embodiment of the weight transfer support device 10 without a face shield attached. More specifically, FIGS. 1-5 show a weight transfer support device that has two shoulder extensions 11 extending upward and away from the upper back plate 12 to which they are attached. The shoulder extensions 11 can be attached to the front (ventral) side of the upper back plate 12 or to the back (dorsal) side of the upper back plate 12. The shoulder extensions 11 have an outer surface that faces upward and away from the user's shoulders when the device 10 is worn. The outer surface of the shoulder extensions can feature nonslip pads 15 to help hold a garment (not shown) in place. Additional padding 16 is attached to either the upper back plate 12 or the shoulder extensions 11 depending on how the shoulder extensions 11 are attached to the upper back plate 12. The pads 16 need to be positioned so they will contact the wearer when the device 10 is worn. The upper back plate 12, the attachment bar 14 and the pads 16 all feature complementary holes that allow for the insertion of fastening devices to connect the various parts as described above.

These figures also show the attachment bar 14 that is attached to the upper back plate 12 at a first end and the lower back plate 13 at a second end. The lower end of the attachment bar 14 features a plurality of holes 17 that are complementary in size and shape and align with one or more holes that pass through the portion of the lower back plate 13. The height of the upper back plate 12 and shoulder extensions 11 can be adjusted as follows. The attachment bar 14 can be held in place using a fastener 18 inserted through the holes 17 in the lower back plate 13 and the lower end of the attachment bar 14. With the fastener 18 removed, the attachment bar 14 can be positioned such that different holes in the attachment bar 14 are aligned with the hole(s) in the lower back plate 13 thereby adjusting the overall height of the device 10. In preferred embodiments and the inventors' anticipated best mode of the device 10, the fastener 18 is a retractable plunger, i.e. a spring-loaded plunger such as a twist-to-lock pull-ring retractable spring plunger.

The lower back plate 13 has a section that is configured to accept or accommodate a lower end of the attachment bar 14. In the embodiment shown in these figures, the upper edge of the lower back plate 13 is shaped like an open-faced channel or bracket 19 into which the lower end of the attachment bar 14 inserts. Note, in the pictured embodiment, the portion of the attachment bar 14 that features the holes 17 is recessed a little bit, i.e. the attachment bar is not flush with the inner surface of the lower back plate 13. This allows for the insertion of the plunger 18 without the end of the plunger 18 sticking the person wearing the device 10 in the back. It also helps to create distance between the user and the garment being worn so that air can circulate near the user's body.

The lower back plate 13 also features one or more belts. This embodiment has two belts—a hip belt 20 and a stretch belt 21. The hip belt 20 is directly attached to the lower back plate 13 while the stretch belt is connected to the hip belt 20 either using the same fasteners inserted through the lower back plate 13 and the two belts 20, 21 or using separate fasteners attached to the hip belt 20. The inventors' anticipated best mode uses hook and loop fasteners (not shown) to attach the stretch belt 21 to the hip belt 20.

Referring now to the invention in more detail, in FIGS. 6A through 6D there is shown an example of a preferred embodiment of the first embodiment of the disclosed face shield. This particular embodiment includes a face shield 22 that extends from one side of the user's head to the other, providing coverage for the user's entire facial area. The face shield 22 includes a shield mount 23 that is fixed to the face shield 22. The shield mount 23 in this example is a block featuring bores or holes into which fasteners can be inserted to attach the shield mount 23 to the face shield 22. In preferred embodiments, the shield mount is constructed of Delrin plastic (Acetal). This embodiment of the shield mount 23 also features a thumb screw 24 or other means of releasably attaching the shield mount 23 to a vertical section 26 of a yoke mount 25. In this embodiment, the yoke mount 25 is a cylindrical tube or bar featuring a vertically oriented section 26 at each of the two ends of the yoke mount 25 and a horizontally oriented section 27 connecting the two vertical sections 26. The yoke mount 25 is positioned such that the horizontal section 28 wraps around the back of the user's head as it extends from one vertical section 26 to another.

The user can adjust the position of the face shield 22 relative to their face or the vertical section 26 of the yoke 25 by loosening the thumb screw 24, moving the face shield 22 up or down on the vertical section 26 and then manipulating the thumb screw 24 to tighten the connection between the yoke mount 25 and the face shield 22.

In these embodiments, the face shield 22 attaches to the weight transfer device 10 described above through the horizontally oriented section 27 of the yoke mount 25 attached to a back attachment bar 28. The back attachment bar 28 is a flattened structure that is attached to and extends upward away from the upper back plate 12 of the weight transfer device 10 described above. It terminates in a machined fitting 29 that accommodates and holds a portion of the horizontal section 27 of the yoke mount 25. In the pictured embodiment, the machined fitting 29 consists of two plates 30 joined together by a fastener that form a small channel or groove 31 into which the yoke mount 25 fits. The plates 30 are tightened together to encircle a portion of the horizontal section 27 of the yoke mount 25. This configuration also allows the yoke mount to rotate around the longitudinal axis of the horizontal section 27 of the yoke mount 25, specifically the longitudinal axis of the portion of the yoke mount 25 that is attached to the back attachment bar 28. This rotational movement allows the face shield 22 to tilt when the user tilts their head forward. It also allows the user to move the face shield 22 out of their way by lifting the face shield 22 up and over their head, allowing the face shield 22 to rest against the back of the weight transfer device 10 when not needed.

FIGS. 7A through 7D show another set of embodiments of the face shield 22. In this embodiment, the yoke mount is replaced with a vertical mount bar 32 attached to a horizontal slide bar 33 with a mount configured to attach to the shoulder extensions 11 of the weight transfer device 10. The face shield 22 is attached to the vertical mount bar 32 in much the same way as the face shield in the embodiments above was attached to the vertical section 26 of the yoke mount 25, i.e. the shield mount 23 in this embodiment works the same way as it does for the above embodiment. The mount or shoulder extension mount 34 is releasably attached to the horizontal slide 33 using a thumbscrew 24 or other attachment means. The position of the face shield 22 relative to the user can be adjusted up and down the vertical mount bar 32 as described above with the vertical section 26 of the yoke mount 25 and the horizontal position of the face shield 22 can be adjusted in a similar manner. The thumb screw 24 on the shoulder extension mount 34 can be loosened to allow for repositioning of the horizontal slide bar 33 relative to the shoulder extension mount 34 thereby adjusting the position of the face shield 22. In this particular embodiment, there are vertical mounts 32, horizontal slide bars 33 and shoulder extension mounts 34 on either side of the user/weight transfer device 10 to allow for the positioning of face shield 22 on both sides of the user.

Figure 8B:
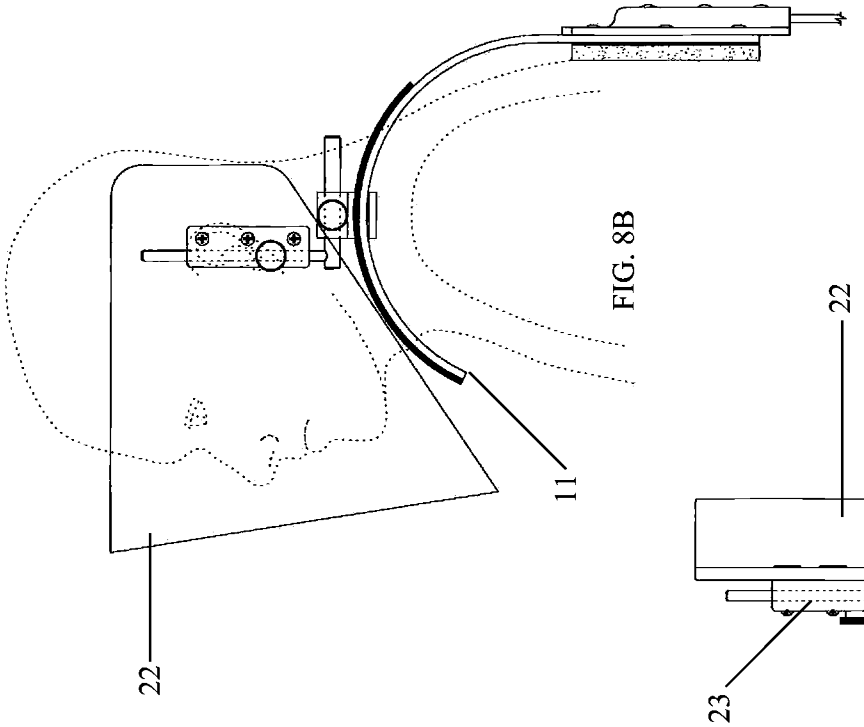
FIG. 8B is a right side perspective view thereof.
Figure 8D:
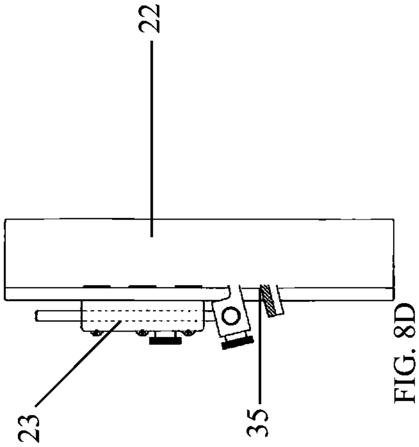
FIG. 8D is a rear perspective view thereof.
Figure 8A:
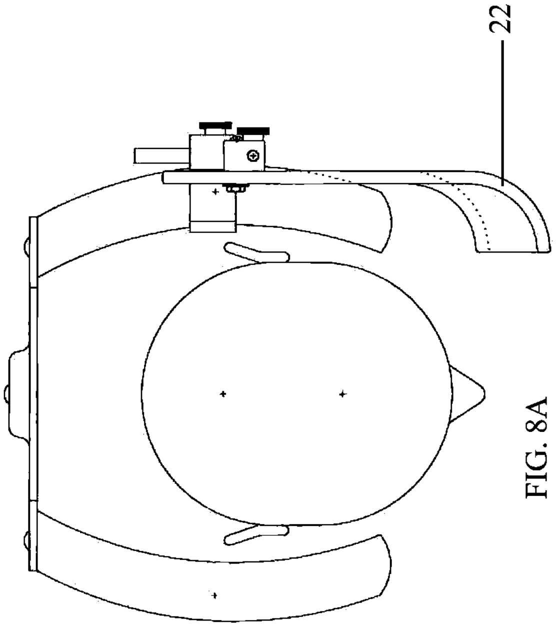
FIG. 8A is a top perspective view of an embodiment of the weight transfer support system featuring a third embodiment of the face shield.
Figure 8C:
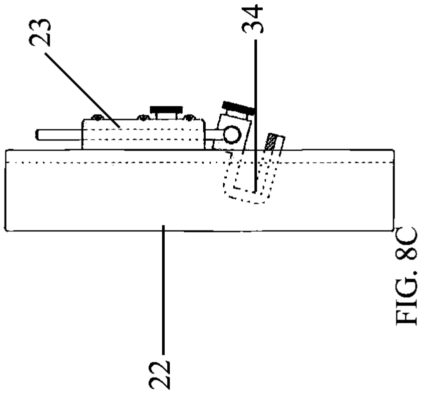
FIG. 8C is a front perspective view thereof.
Figure 9A:
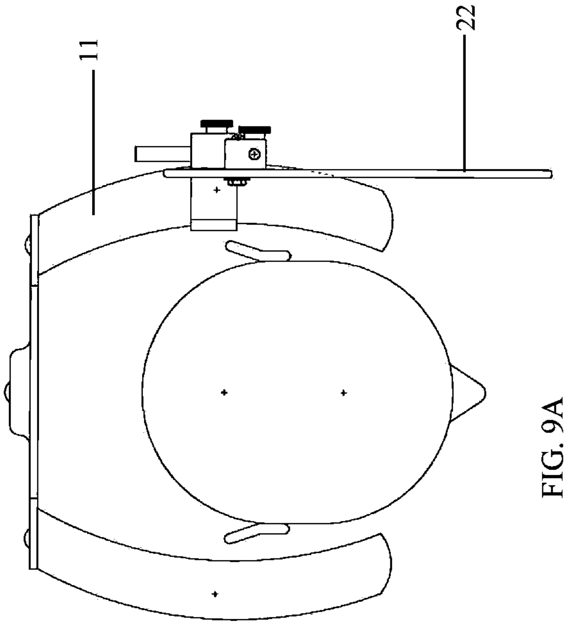
FIG. 9A is a top perspective view of an embodiment of the weight transfer support system featuring a fourth embodiment of the face shield.
Figure 9B:
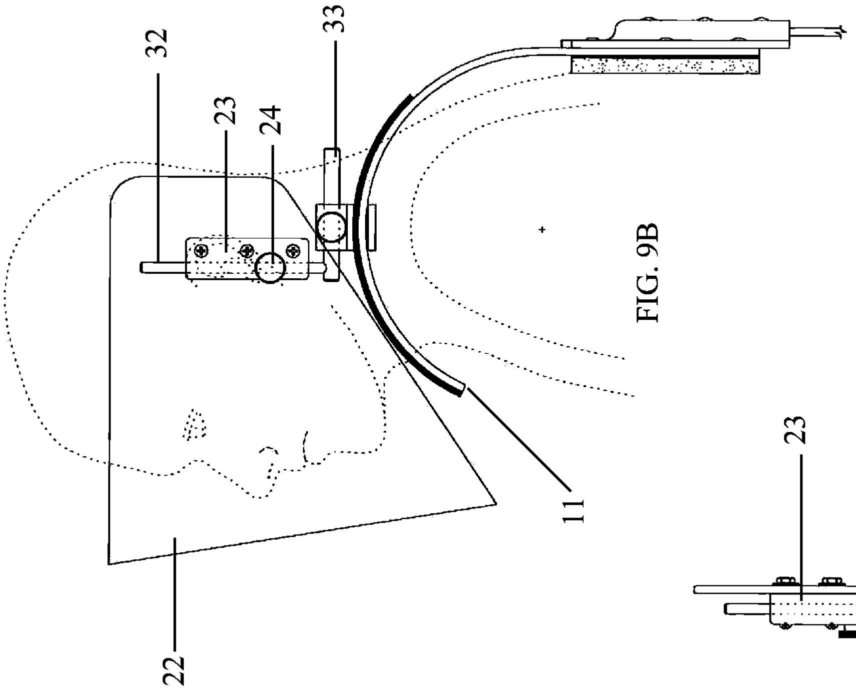
FIG. 9B is a right side perspective view thereof.
Figure 9C:
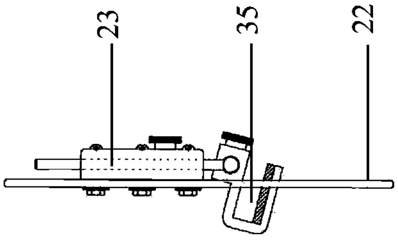
FIG. 9C is a front perspective view thereof.
Figure 9D:
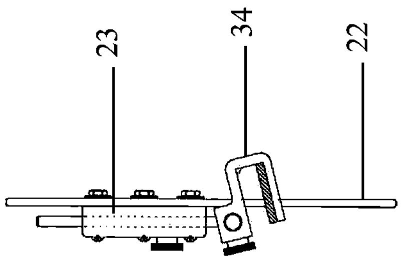
FIG. 9D is a rear perspective view thereof.

FIGS. 8A through 8D show alternate versions of the face shield 22 as used with the above described embodiments; however, these face shields can be used with either the yoke mount 25 or the shoulder extension mount 34. Because it is common for medical professionals to have difficulty communicating with other people in the room while they are wearing a face shield that covers a significant portion of their mouth and the source of radiation in an operating room is often located to the side of the surgeon, the inventors have devices other face shields that do not cover their entire mouth. For example, FIG. 8A shows a partial lead acrylic shield 22 that is open in the front and bends toward the other side of the user as it extends past the user's face. FIGS. 9A through 9B show another embodiment in which the face shield is a flat piece of material extends along the side of the user's head only. These iterations of the face shield allow the surgeon to more easily communicate with others in the room while staying shielded from a radiation source that is not directly in front of them.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A weight transfer device, comprising:

a first shoulder extension comprising a rigid bar configured to extend at least partially above a shoulder of a user;

a second shoulder extension comprising a second rigid bar configured to extend at least partially above a shoulder of the user;

an upper back plate configured to be connected to the first shoulder extension and the second shoulder extension;

a lower back plate comprising an inner surface and outer surface, wherein the inner surface comprises a recessed open-faced channel or bracket region and a hole extending through the lower back plate and into the recessed open-faced channel or bracket region;

an attachment member comprising a first end and spaced apart second end, wherein the first end is configured to be attached to the upper back plate, wherein the second end includes a second end portion extending from the second end, the second end portion comprises a plurality of spaced apart holes extending through the attachment member, wherein one of the one or more of the plurality of spaced apart holes in the second end region is configured to releasably engage with an attachment mechanism and the attachment mechanism is configured to be arranged through one of the one or more plurality of spaced apart holes in the attachment member and the hole extending through the lower back plate; and at least one belt configured to be attach to the lower back plate.

2. The weight transfer device of claim 1, wherein the attachment member comprises a rigid material.

3. The weight transfer device of claim 2, wherein the attachment mechanism comprises a biasing member configured to move from a first extended position to a second retracted position upon application of a force to the biasing member.

4. The weight transfer device of claim 1, further comprising a second belt positioned inside the at least one belt.

5. The weight transfer device of claim 1, further comprising a face shield configured to shield or reduce radiation.

6. The weight transfer device of claim 5, further comprising a yoke mount having at least one vertically oriented section to which the face shield is configured to be releasably attached.

7. The weight transfer device of claim 6, wherein the yoke mount is a bent rod that has vertical sections at each of two opposing ends and a horizontal section joining the vertical sections.

8. The weight transfer device of claim 1, further comprising a non-slip material arranged on a portion of the first shoulder extension and the second shoulder extension.

9. A weight transfer device, comprising:

a first shoulder extension comprising a rigid bar configured to extend at least partially above a shoulder of a user;

a second shoulder extension comprising a second rigid bar configured to extend at least partially above a shoulder of the user;

an upper back plate configured to be connected to the first shoulder extension and the second shoulder extension;

a non-slip material attached to at least a portion of the first shoulder extension and the second shoulder extension;

a lower back plate comprising a front side and a rear side, wherein the front side comprises a recessed bracket region and hole extending through the lower back plate and into the recessed bracket region;

an attachment member comprising a first end region and spaced apart second end region, wherein the first end region is configured to be attached to the upper back plate, wherein the second end region comprises a plurality of spaced apart holes extending through the attachment member, wherein one of the plurality of spaced apart holes in the second end region and the hole in the lower back plate are configured to releasably engage an attachment mechanism; and a first belt configured to be attached to the lower back plate.

10. The weight transfer device of claim 9 further comprising: a face shield configured to block radiation.

11. The weight transfer device of claim 10, wherein the face shield is configured to extend along a side of a user's head.

12. The weight transfer device of claim 10, wherein the face shield is substantially flat and is configured to extend only laterally along a side of a user's head.

13. A weight transfer device, comprising:

a first shoulder extension comprising a rigid bar configured to extend at least partially above a shoulder of a user;

a second shoulder extension comprising a second rigid bar configured to extend at least partially above a shoulder of the user;

an upper back plate configured to be connected to the first shoulder extension and the second shoulder extension;

a lower back plate comprising a front side and a rear side, wherein the lower back plate includes a hole extending through the front side and read side, wherein the lower back plate includes a recessed bracket; and an attachment member comprising a first end portion with a plurality of spaced apart side holes and second end portion with one or more holes, wherein one or more of the plurality of spaced apart holes is configured to releasably engage attachment mechanism to releasably attached the attachment member to the lower back plate a predetermined position and the one or more holes are configured to allow attachment to the upper back plate with one or more upper attachment mechanisms.

* * * * *